United States Patent [19]
Jacoby et al.

[11] Patent Number: 5,559,322
[45] Date of Patent: Sep. 24, 1996

[54] IMAGING OPTICAL TRACKER

[75] Inventors: Jerold L. Jacoby, Long Beach; Peter M. Livingston, Palos Verdes Estates, both of Calif.

[73] Assignee: TRW Inc., Redondo Beach, Calif.

[21] Appl. No.: 710,735

[22] Filed: Mar. 11, 1985

[51] Int. Cl.$^6$ .............................. G01C 21/02; G01J 5/02; G01B 11/26

[52] U.S. Cl. .................... 250/203.1; 250/203.3; 250/203.6; 250/332; 250/342; 356/141.5

[58] Field of Search ................. 356/152, 141.5; 250/221, 222.2, 203 R, 332, 342, 203.1, 203.3, 203.6

[56] References Cited

U.S. PATENT DOCUMENTS

| | | | |
|---|---|---|---|
| 3,440,380 | 5/1969 | Webb et al. | 250/342 |
| 3,486,826 | 12/1969 | Colvin et al. | 356/141 |
| 3,564,257 | 2/1971 | Berry et al. | 250/342 |
| 3,611,385 | 10/1971 | McHenry | 250/342 |
| 3,951,550 | 4/1976 | Slick | 356/141 |
| 4,092,072 | 5/1978 | Ellis | 356/152 |
| 4,097,750 | 6/1978 | Lewis et al. | 250/548 |
| 4,193,689 | 3/1980 | Reymond et al. | 356/152 |
| 4,209,254 | 6/1980 | Reymond et al. | 356/152 |
| 4,229,103 | 10/1980 | Hipp | 356/141 |
| 4,277,169 | 7/1981 | Krieg | 356/152 |
| 4,289,960 | 9/1981 | Smith et al. | 250/222 |
| 4,315,690 | 2/1982 | Trocellier et al. | 356/152 |
| 4,425,043 | 1/1984 | van Rosmalen | 356/375 |
| 4,582,428 | 4/1986 | Holl et al. | 356/152 |

Primary Examiner—Stephen C. Buczinski

[57] ABSTRACT

Apparatus and a corresponding method for its use, for detecting and tracking targets in an optical field of view. The apparatus includes conventional telescopic optics to gather light from the field of view, beam splitters to divide the resultant beam into three sub-beams, three linear arrays of detectors, and three cylindrical lens systems to focus the three beams onto the detector arrays. Two of the arrays provide azimuth-angle and elevation-angle information concerning possible target positions, and the third is oriented at an angle to the first two, to provide information to resolve any ambiguities as to the target locations. The linear arrays can be scanned much more rapidly than a rectangular array, and higher resolutions can therefore be obtained without any sacrifice in processing speed.

7 Claims, 3 Drawing Sheets

$$N_X = \begin{pmatrix} 0 & 0 & 0 & 0 & 0 & 0 & 0 & 0 & 0 \\ 1 & 1 & 1 & 1 & 1 & 1 & 1 & 1 & 1 \\ 0 & 0 & 0 & 0 & 0 & 0 & 0 & 0 & 0 \\ 0 & 0 & 0 & 0 & 0 & 0 & 0 & 0 & 0 \\ 1 & 1 & 1 & 1 & 1 & 1 & 1 & 1 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 1 & 1 & 1 & 1 & 1 & 1 & 1 & 1 & 1 \\ 0 & 0 & 0 & 0 & 0 & 0 & 0 & 0 & 0 \end{pmatrix}$$

FIG. 4a $$N_Y = \begin{pmatrix} 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \\ 0 & 1 & 0 & 0 & 1 & 0 & 0 & 1 & 0 \end{pmatrix}$$

FIG. 4b $$N_R = \begin{pmatrix} 0 & 0 & 1 & 0 & 0 & 0 & 0 & 0 & 0 \\ 0 & 1 & 0 & 0 & 0 & 0 & 0 & 0 & 0 \\ 1 & 0 & 0 & 0 & 0 & 0 & 0 & 0 & 0 \\ 0 & 0 & 0 & 0 & 0 & 0 & 0 & 0 & 1 \\ 0 & 0 & 0 & 0 & 0 & 0 & 0 & 1 & 0 \\ 0 & 0 & 0 & 0 & 0 & 0 & 1 & 0 & 0 \\ 0 & 0 & 0 & 0 & 0 & 1 & 0 & 0 & 0 \\ 0 & 0 & 0 & 0 & 1 & 0 & 0 & 0 & 0 \\ 0 & 0 & 0 & 1 & 0 & 0 & 0 & 0 & 0 \\ 0 & 0 & 1 & 0 & 0 & 0 & 0 & 0 & 0 \end{pmatrix}$$

FIG. 4c $$N_X \oplus N_Y = \begin{pmatrix} 0 & 1 & 0 & 0 & 1 & 0 & 0 & 1 & 0 \\ 1 & \underline{2} & 1 & 1 & \underline{2} & 1 & 1 & \underline{2} & 1 \\ 0 & 1 & 0 & 0 & 1 & 0 & 0 & 1 & 0 \\ 0 & 1 & 0 & 0 & 1 & 0 & 0 & 1 & 0 \\ 1 & \underline{2} & 1 & 1 & \underline{2} & 1 & 1 & \underline{2} & 0 \\ 0 & 1 & 0 & 0 & 1 & 0 & 0 & 1 & 0 \\ 0 & 1 & 0 & 0 & 1 & 0 & 0 & 1 & 0 \\ 1 & \underline{2} & 1 & 1 & \underline{2} & 1 & 1 & \underline{2} & 1 \\ 0 & 1 & 0 & 0 & 1 & 0 & 0 & 1 & 0 \end{pmatrix}$$

FIG. 4d $$N_R \oplus (N_X \oplus N_Y) = \begin{pmatrix} 0 & 1 & 1 & 0 & 1 & 0 & 0 & 1 & 0 \\ 1 & \boxed{3} & 1 & 1 & 2 & 1 & 1 & 2 & 1 \\ 1 & 1 & 0 & 0 & 1 & 0 & 0 & 1 & 0 \\ 0 & 1 & 0 & 0 & 1 & 0 & 0 & 1 & 1 \\ 1 & 2 & 1 & 1 & 2 & 1 & 1 & \boxed{3} & 0 \\ 0 & 1 & 0 & 0 & 1 & 0 & 1 & 1 & 0 \\ 0 & 1 & 0 & 0 & 1 & 1 & 0 & 1 & 0 \\ 1 & 2 & 1 & 1 & \boxed{3} & 1 & 1 & 2 & 1 \\ 0 & 1 & 0 & 1 & 1 & 0 & 0 & 1 & 0 \end{pmatrix}$$

FIG. 4e

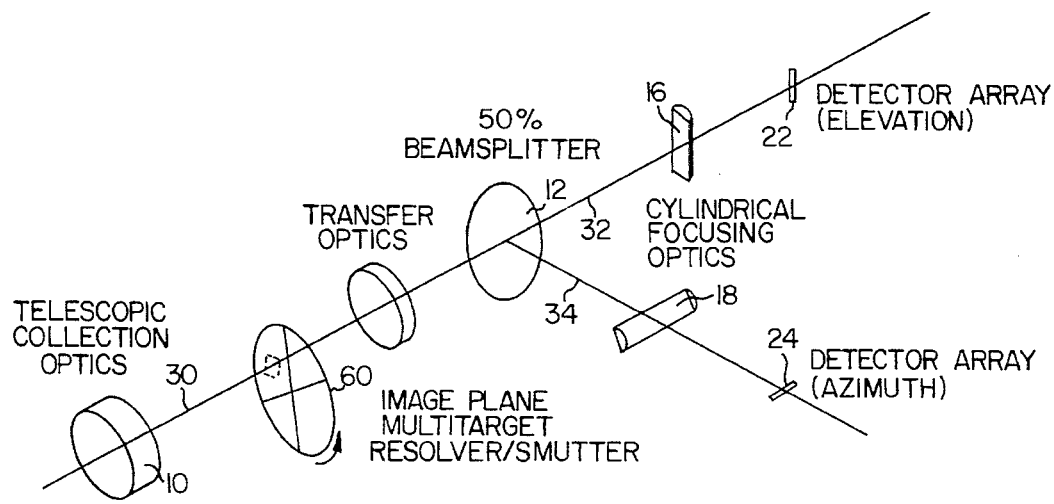

FIG. 5

IMAGING OPTICAL TRACKER

BACKGROUND OF THE INVENTION

This invention relates generally to image detection and processing, and more particularly, to imaging optical trackers for detecting and tracking target data in azimuth and elevation. Radar systems for tracking targets at a relatively close range are limited by their long wavelength and susceptability to "clutter" or noise in the near field.

Optical trackers have been developed to alleviate these drawbacks of radar systems. In an imaging optical tracking system, an optical image of a field of interest is focused onto an array of detectors, which generates a corresponding set of electrical signals. The optical tracking system also performs a complex signal processing function, to determine and track the coordinates of multiple targets within the field. The complexity and cost of such a system increases as rapidly as the square of the required resolution and array size. For desirably high resolutions, the complexity and cost are unacceptably high, and the processing speed is reduced.

Accordingly, there is a need for an optical tracking system that can achieve high resolution levels, but without the cost and complexity associated with large optical detector arrays. The present invention satisfies this need.

SUMMARY OF THE INVENTION

The present invention resides in an optical tracking system in which a two-dimensional image is reduced to two orthogonally related linear image arrays, and in which means are provided to resolve any ambiguity associated with multiple images in the two arrays. Basically, and in general terms, the invention comprises telescopic collection optics, to produce an input beam from a field of view in which one or more targets are to be detected, power dividing means, for dividing the beam into first and second beam portions, first and second linear detector arrays, oriented to provide orthogonal coverage of the field of view, and cylindrical focusing optics, for focusing each of the beam portions onto the respective linear detector arrays. The invention also includes signal processing means for determining from the outputs of the arrays the coordinates of one or more targets within the field of view, and means for providing additional information to the processing means, for purposes of resolving any ambiguity with respect to the positions of multiple targets in the field of view. In the preferred embodiment of the invention, the means for providing the additional information to resolve any ambiguities includes a third linear detector array, oriented at an angle to the first two arrays.

In the illustrative embodiment, the power dividing means includes two beam splitters, and the cylindrical focusing means includes a cylindrical lens disposed in each of the beam portions. Each cylindrical lens has the effect of compressing the field of view in one dimension. For example, one of the linear arrays receives light from all elevation angles, and another receives light from all azimuth angles. For a single target, the elevation and azimuth coordinates can be obtained directly from these two orthogonally related arrays. However, the coordinates of multiple targets cannot be unambiguously determined from the two orthogonally related arrays. The third array is oriented at an angle to both of the other arrays, for example at a forty-five degree angle, and ambiguities can then be resolved from the third detector outputs.

In one preferred embodiment of the invention, the signal processing means includes means for converting each linear array of output signals into a two-dimensional map containing elements indicative of possible target positions, and means for logically combining corresponding map elements in the three maps, to obtain the actual target positions. If the possible target positions are indicated as map elements signified by ones and the other positions in the maps are signified by zeros, the means for logically combining the map elements then includes means for logically ANDing corresponding map elements, or merely means for arithmetically adding the elements and selecting those elements that have an arithmetic total of three.

The method of the invention includes the steps of focusing a two-dimensional image into a beam, dividing the beam into three separate sub-beams, and focusing each of the three sub-beams onto a separate linear array, one of which is aligned horizontally with the image, one of which is aligned vertically, and the third of which is oriented at an angle to the first two. The final step is one of processing the outputs of the linear arrays to determine unambiguously the positions of any targets detected in the image. In the illustrative embodiment, the processing step includes generating two-dimensional maps corresponding to the three linear arrays, and ANDing together corresponding elemental signals in the three maps, to obtain the true positions of the targets.

It will be appreciated from the foregoing that the present invention represents a significant advance in the field of optical tracking systems. In particular, the invention provides a reliable indication of detected targets in a field of view, without the need for costly two-dimensional detector arrays, and at a considerably higher processing speed than that of the conventional two-dimensional array technique. In the conventional system, an image is converted into $N^2$ electrical signals read out in serial order, if the array has N detectors on a side. The readout time is therefore proportional to $N^2$. For the new technique, however, the read-out time is proportional to N. In comparison with an array having 1000×1000 elements, for example, the new technique gives improvements in processing speed by approximately a factor of 1000. Other aspects and advantages of the invention will become apparent from the following more detailed description, taken in conjunction with the accompanying drawings.

BRIEF DESCRIPTION OF THE DRAWINGS

FIGS. 4a–4e together illustrate a signal processing technique for resolving multiple target ambiguities;

FIG. 5 is a perspective view of an alternative arrangement for resolving ambiguities.

DESCRIPTION OF THE PREFERRED EMBODIMENTS

Figure 1:
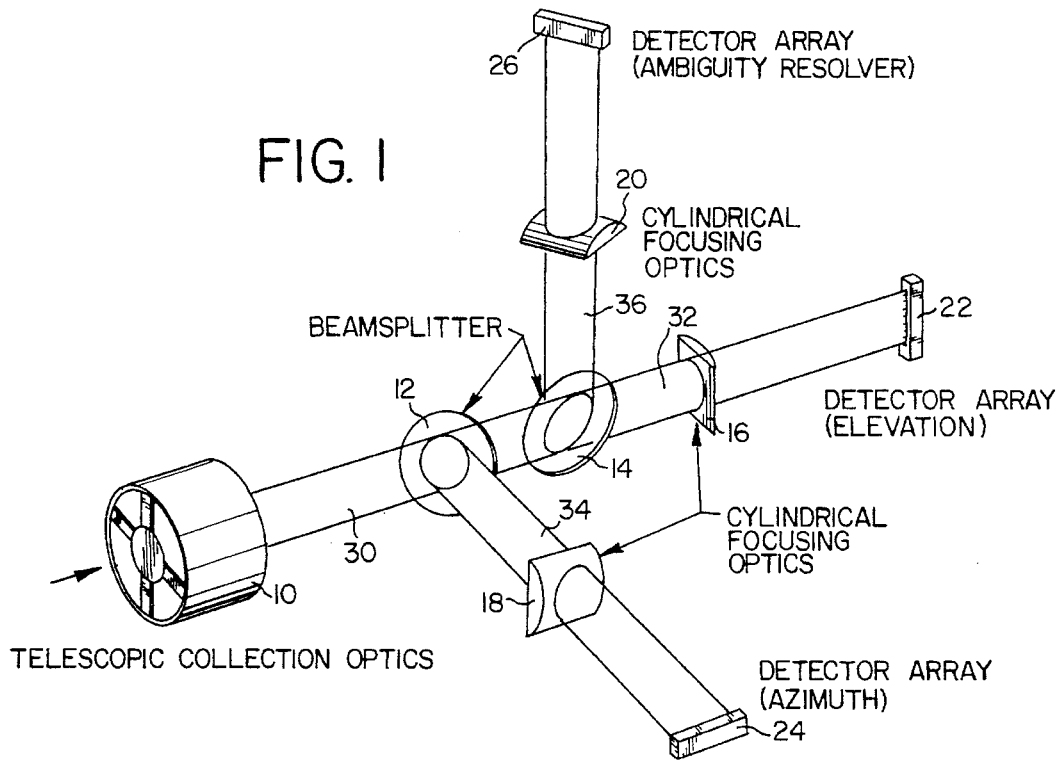
FIG. 1 is diagrammatical perspective view of the optical apparatus of the invention.

As shown in the drawings for purposes of illustration, the present invention is concerned with optical tracking systems, in which multiple "targets" within a selected field of view are detected and located in accordance with their elevation and azimuth angles within the field. The elevation angle measures the angular height of a target above the horizon, and the azimuth angle measures the horizontal direction of the target with respect to a reference direction. Optical systems provide superior performance for relatively close-in tracking, since radar has significant disadvantages arising from its long wavelength and its inability to distinguish noise or "clutter" from actual target information. However, conventional optical tracking systems employ two-dimensional arrays of detectors. For high resolution, the arrays need large numbers of detectors, and the time required to scan them serially is proportional to the square of the array length, assuming a square array.

In accordance with the invention, an optical image is first converted onto two linear arrays, representative of elevation angle and azimuth angle information, and the positions of detected targets within the image are determined from the linear arrays. For multiple targets, ambiguity is resolved by providing additional information from a third linear array.

The term "target" as used in this specification is not intended to limit the application of the invention to the tracking of military targets. The invention may be usefully employed, for example, in any situation in which radar is not an ideal near-field tracking system. Applications may include commercial aviation, for example. More generally, the invention may be employed in any image resolution application in which high contrast data must be resolved against an uncluttered background.

As shown in FIG. 1, the apparatus of the invention in its preferred embodiment includes conventional telescopic optics, indicated by reference numeral 10, two beam splitters 12 and 14, three cylindrical focusing lenses 16, 18, and 20, and three linear detector arrays 22, 24, and 26. The collection optics 10 are directed toward a field of view and produce a single compressed beam 30 that contains all of the optical information relating to the field, which may contain one or more targets that are to be detected and tracked.

The beam 30 is divided into three separate sub-beams 32, 34 and 36 by operation of the beam splitters 12 and 14. The three sub-beams 32, 34 and 36 are preferably of approximately equal power. Cylindrical focusing lens 16 focuses sub-beam 32 onto the first array of detectors 22, which is oriented vertically and provides a measure of the elevation angle of any detected target. In other words, any target at a particular elevation angle will appear at the same position in the vertical array, regardless of its azumuth angle. Similarly, cylindrical lens 18 focuses beam 34 onto linear detector array 24, which is oriented horizontally and provides a measure of azimuth angle. Any detected target at a particular azimuth position, regardless of its elevation, will appear at the same position of the horizontal detector array 24.

Figure 3:
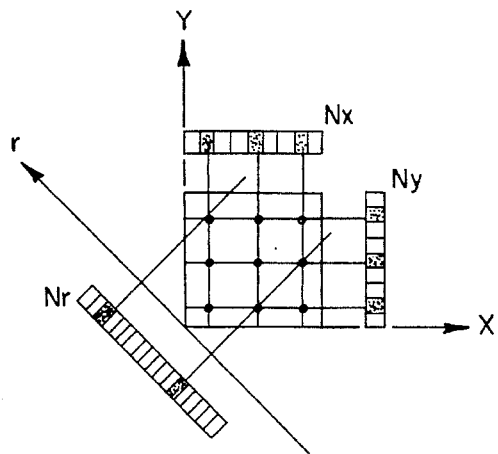
FIG. 3 is a diagram illustrating the role of a third detector array in resolving multiple target ambiguities.

The use of only two linear arrays, such as the arrays 22 and 24, will result in ambiguities in the results if there are multiple targets present in the image, as FIG. 3 shows for an exemplary 9×9 image. In this example, three targets are present in the image. Moreover, there is one target in each of three rows of the image, and one target in each of three columns of the image. Therefore, both of the linear arrays, indicated as $N_x$ and $N_y$, will include target indications at three elemental positions. This is an ambiguous result, since it would be possible to exchange the row positions or the column positions of any two of the three targets, without changing the effect on the $N_x$ and $N_y$ arrays.

The ambiguity is resolved by means of an additional linear array, referred to in FIG. 3 as the $N_r$ array, oriented in a different direction from the x and y directions of the first two arrays. The most convenient direction of orientation of the third array is at 45 degrees to the x and y axes. The true target positions are then easily located from the points of intersection of lines drawn through the image area from the target indications in each array, and perpendicular to the array. Thus, lines 40 from array $N_x$, and lines 42 from array $N_y$, and lines 44 from array $N_r$, intersect only at points 46, 47 and 48, which are the true target points in the image.

Figure 2:
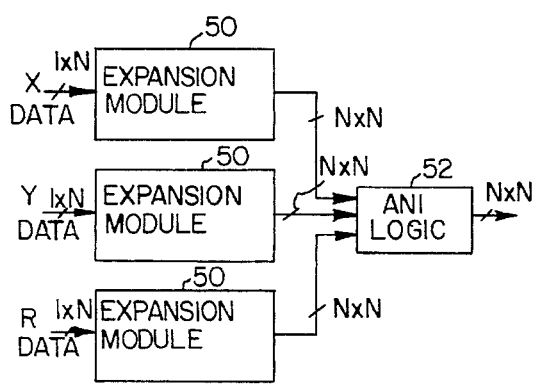
FIG. 2 is a block diagram of the signal processing components of the invention.

The array $N_r$ of FIG. 3 is the third detector array 26 in FIG. 1, the cylindrical lens 20 being oriented to provide a 45-degree orientation for the resolving array 26. The outputs of the detector arrays 22, 24 and 26 are connected to a signal processing module, such as that shown in FIG. 2. For purposes of explanation, this module can be considered as including three expansion modules 50, and AND logic 52. The expansion modules perform the inverse function to that of the cylindrical lens, in that they expand the linear electrical image from an array into a square or rectangular image, by repetition of the contents of the linear array. For example, FIGS. 4a–4c show how the arrays $N_x$, $N_y$ and $N_r$ of FIG. 3 would be expanded in this module. A "1" indicates a target position in the original array, and a "0" indicates no detected target position. It will be appreciated from FIGS. 4a–4c that the alignment of "1's" in the figures corresponds to the lines 40, 42 and 44 in FIG. 3.

To determine the points of intersection of the rows of "1's," corresponding elements in the expanded images from the expander modules 50 are ANDed together in the AND logic 52. FIGS. 4d and 4e show the result of the ANDing operation in two steps. FIG. 4d shows the logical AND of the expanded $N_x$ and $N_y$ arrays. The ambiguous target points appear as nine "2's" in this view. Strictly speaking, the "2's" are the result of an arithmetic addition, rather than ANDing, but they serve to illustrate the principle of operation more clearly. Then FIG. 4e shows the result of ANDing the expanded $N_r$ array with the ANDed $N_x$ and $N_y$ arrays. The ambiguity is resolved and the target positions are shown as three "3's" in the figure.

The AND logic 52 can take a variety of specific forms, and, in a practical embodiment, would not need to employ the expansion modules 50, which were included for purposes of illustration.

It will be appreciated that the invention provides a substantial speed advantage over conventional approaches for the same purpose. Scanning an N×N array of detectors takes a time proportional to $N^2$, which becomes very large for acceptable resolutions. In the invention, the scanning time of the two orthogonal arrays is proportional to N, and the scanning time for the diagonal array is about 2N. For image sizes of 1,000×1,000, the improvement in speed is a factor of 500 or more.

Figure 6A:
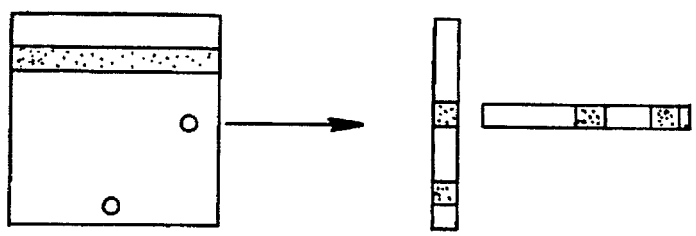
FIGS. 6a–6c together illustrate the alternative approach for resolution of ambiguities.
Figure 6B:
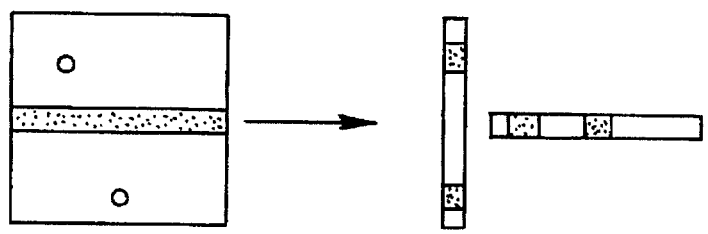
Figure 6C:
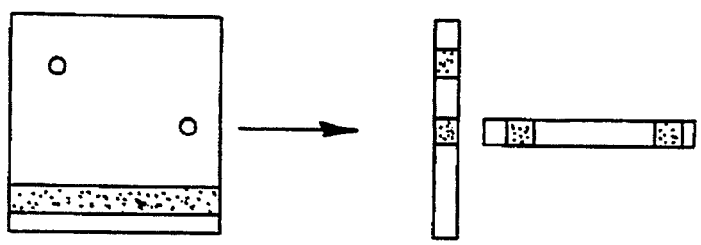

An alternative technique for resolving the ambiguities is shown in FIGS. 5 and 6. In FIG. 5, the third array for resolving ambiguities is omitted. Instead, the apparatus includes a rotatable shutter 60 located to interrupt the input beam, and to selectively mask out one row of the image. The effect of this is shown in FIGS. 6a–6c. In FIG. 6a, the top row is masked out, i.e. light in the top row is temporarily blocked. The $N_x$ and $N_y$ arrays then indicate targets as shown. Since the target in the first column of the top row is blocked, neither the top element of the $N_y$ array nor the left element of the $N_x$ array shows up in this condition. Thus it is possible to infer that there is a target in the first column of the top row. Similarly, when the middle row is blocked out, as shown in FIG. 6b, it is possible to infer from the resultant aray conditions that the middle-row target is in the third column. Likewise, from FIG. 6c one can conclude that the bottom-row target is in the second column position. The disadvantages of this approach are that it requires a mechanical movement to resolve the ambiguity, and that it requires three time-separated operations to obtain the information needed to resolve the ambiguity. The preferred technique, using a third array, functions practically simultaneously with the basic scanning process, i.e. the three arrays can be scanned together and the target positions determined after operation of the relatively simple signal processing module.

One potential disadvantage of the technique of the invention is that the action of each of the cyindrical lenses appears to render the system more prone to noise. For example, if only one element in a row of a thousand elements is a target, the column-oriented array will at that row position have a target signal derived from the one position, and a noise signal derived from 999 other elements in the row. This means that the signal-to-noise ratio for the linear array may be worse than that of a conventional array by a factor of almost a thousand. One solution to this apparent problem is to provide for time integration of the target signals in the signal processing modules. The signals derived from noise will integrate in an incoherent fashion, but the signals derived from a target position will accumulated more rapidly. In this manner, the signal-to-noise ratio will be increased with time and a satisfactory result can be obtained in spite of the apparent problem.

It will be appreciated from the foregoing that the present invention represents a significant advance in the field of optical tracking systems. In particular, the invention provides a novel technique for detecting and tracking multiple targets in a selected field, with a substantial reduction in scanning speed as compared with the conventional approaches to the same problem. It will also be appreciated that, although a specific embodiment of the invention has been described in detail for purposes of illustration, various modifications may be made without departing from the spirit and scope of the invention. Accordingly the invention is not to be limited except as by the appended claims.

We claim:

1. An optical imaging system, comprising:
   telescopic collection optics, to produce an input beam from a field of view in which one or more targets are to be detected;
   power dividing means, for dividing the beam into first, second and third sub-beams;
   first, second and third linear detector arrays, two of which are oriented to provide orthogonal coverage of the field of view and the third of which is oriented at an angle to the other two;
   cylindrical focusing optics, for focusing each of the sub-beams onto the respective linear detector arrays; and
   signal processing means for determining from the outputs of the arrays the coordinates of one or more targets within the field of view.

2. An optical imaging system as set forth in claim 1, wherein the signal processing means includes:
   means for converting the output of each of the arrays into a two-dimensional map indicating possible target locations as rows or columns; and
   means for logically combining the three maps to provide a map showing the actual target locations.

3. An optical imaging system as set forth in claim 2 wherein:
   the means for logically combining includes means for logically ANDing corresponding elements of the three maps.

4. A method for optically tracking multiple targets in a field of view, comprising the steps of:
   focusing a two-dimensional image of the field of view into a beam;
   dividing the beam into three separate sub-beams;
   focusing each of the three sub-beams onto a separate linear array, one of which is aligned horizontally with the image, one of which is aligned vertically, and the third of which is oriented at an angle to the first two; and
   processing the outputs of the linear arrays to determine unambiguously the positions of any targets in the image.

5. A method as set forth in claim 4, wherein the processing step includes:
   generating two-dimensional maps corresponding to the three linear arrays; and
   ANDing together corresponding elemental signals in the three maps, to obtain the actual positions of the targets.

6. An optical imaging system, comprising:
   telescopic collection optics, to produce a substantially collimated beam from a field of view in which one or more targets are to be detected;
   power dividing means, for dividing the beam into first and second sub-beams;
   first and second linear detector arrays, oriented to provide orthogonal coverage of the field of view;
   cylindrical focusing optics, for focusing each of the sub-beams onto the respective linear detector arrays;
   signal processing means for determining from the outputs of the arrays the coordinates of one or more targets within the field view; and
   means for providing additional information to the signal processing means, for purposes of resolving any ambiguity with respect to the positions of multiple targets in the field of view;
   in which said means for providing additional information to the signal processing means includes:
      additional power dividing means to produce a third sub-beam;
      a third linear detector array, oriented to provide coverage of the field of view in a separate direction; and
      additional cylindrical focusing optics to focus the third sub-beam onto the third linear detector array, whereby the output signal from the third linear detector array is used to resolve ambiguities in the target locations.

7. An optical imaging system, comprising:
   telescopic collection optics, to produce a substantially collimated beam from a field of view in which one or more targets are to be detected;
   power dividing means, for dividing the beam into first and second sub-beams;
   first and second linear detector arrays, oriented to provide orthogonal coverage of the field of view;
   cylindrical focusing optics, for focusing each of the sub-beams onto the respective linear detector arrays;
   signal processing means for determining from the outputs of the arrays the coordinates of one or more targets within the field of view;
   means for providing additional information to the signal processing means, for purposes of resolving any ambiguity with respect to the positions of multiple targets in the field of view;
   in which said means for providing additional information includes movable shutter means for selectively masking out rows or columns of the image field, to permit resolution of the ambiguities of target position.

* * * * *